United States Patent
Leach et al.

(10) Patent No.: US 9,960,984 B2
(45) Date of Patent: *May 1, 2018

(54) DEVICE PERFORMANCE MONITORING

(71) Applicant: Comcast Cable Communications, LLC, Philadelphia, PA (US)

(72) Inventors: David Leach, Centennial, CO (US); James Russell, Highlands Ranch, CO (US); Timothy Parol, New Haven, MI (US); David Eng, Littleton, CO (US); Mark Anderson, Lake Worth, FL (US); Dante Burks, Littleton, CO (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 37 days.

This patent is subject to a terminal disclaimer.

(21) Appl. No.: 14/961,089

(22) Filed: Dec. 7, 2015

(65) Prior Publication Data

US 2016/0323168 A1 Nov. 3, 2016

Related U.S. Application Data

(63) Continuation of application No. 14/089,424, filed on Nov. 25, 2013, now Pat. No. 9,251,034.

(51) Int. Cl.
| | |
|---|---|
| *H04L 1/18* | (2006.01) |
| *H04L 12/26* | (2006.01) |
| *H04L 1/20* | (2006.01) |
| *G06F 11/34* | (2006.01) |

(52) U.S. Cl.
CPC .......... *H04L 43/0876* (2013.01); *H04L 43/08* (2013.01); *H04L 43/0817* (2013.01); *H04L 43/16* (2013.01); *G06F 11/3409* (2013.01); *H04L 1/20* (2013.01)

(58) Field of Classification Search
CPC ........................................... H04L 1/18
USPC .......................... 714/751, 749, 746
See application file for complete search history.

(56) References Cited

U.S. PATENT DOCUMENTS

| | | | |
|---|---|---|---|
| 7,181,370 B2* | 2/2007 | Furem ............... | E02F 9/205 701/50 |
| 7,406,399 B2* | 7/2008 | Furem ............... | E02F 9/267 37/379 |
| 7,689,394 B2* | 3/2010 | Furem ............... | E02F 9/267 703/8 |
| 8,516,112 B2 | 8/2013 | Moehler et al. | |
| 8,713,537 B2 | 4/2014 | Dunne et al. | |
| 8,892,415 B2 | 11/2014 | Bourlatchkov et al. | |
| 2003/0225876 A1 | 12/2003 | Oliver et al. | |
| 2007/0179791 A1 | 8/2007 | Ramesh et al. | |

(Continued)

OTHER PUBLICATIONS

Motorola Operation Manual: STDC SmartStream Terminal Data Collector v.2.0.2, pp. 1-90. Specific date unknown but believed to be prior to Sep. 2009.

(Continued)

*Primary Examiner* — Fritz Alphonse

(74) *Attorney, Agent, or Firm* — Banner & Witcoff, Ltd.

(57) ABSTRACT

A computing device performance monitor may be configured to collect performance metric information regarding one or more monitored computing devices, and may assign condition point values to each metric. The performance monitor may generate a total of the condition point values, and use the total to determine an appropriate response.

21 Claims, 3 Drawing Sheets

(56) References Cited

U.S. PATENT DOCUMENTS

2012/0209568 A1    8/2012  Arndt et al.
2016/0085664 A1*  3/2016  Horovitz ............... G06F 11/261
                                                          714/38.1

OTHER PUBLICATIONS

Cisco OID Parameters, pp. 1-40. Specific date unknown but believed to be prior to Nov. 2007.

* cited by examiner

DEVICE PERFORMANCE MONITORING

CROSS-REFERENCE TO RELATED APPLICATIONS

This application is a continuation of U.S. application Ser. No. 14/089,424, filed on Nov. 25, 2013, the entire disclosure of which is herein incorporated by reference.

BACKGROUND

Communication networks rely on the operation of multitudes of individual devices to successfully operate, and maintaining such networks requires identifying and responding to failures and degradations in performance of the various devices. For example, in a content distribution network, individual devices in user homes may provide status report data identifying their own performance. In a network of thousands of devices, processing the large volume of status report data may be challenging, and there remains an ever-present need for effective approaches to managing data to maintain a network.

SUMMARY

The following summary is for illustrative purposes only, and is not intended to limit or constrain the detailed description.

In some embodiments disclosed herein, a health monitoring computing device may identify a plurality of performance metrics for various computing devices whose health will be monitored. For each metric, the health monitoring computing device may identify a plurality of performance metric ranges, and a corresponding condition value (e.g., a point value) for each of the performance metric ranges. The health monitoring computing device may then monitor the health of a computing device by evaluating the various performance metrics for the computing device, assigning a condition value to the monitored device based on how the monitored device's performance metric compares with one or more performance metric ranges. The health monitoring computing device may then aggregate some or all of the various condition point values assigned for the various performance metrics, and use the aggregated value to report the health of the monitored computing device and, if needed, take corrective action.

In some embodiments, the various performance metric ranges may correspond to different levels of performance of the device according to the corresponding performance metric. Various performance metrics may be used, and the metrics may vary depending on the type of computing device being monitored. For example, user premises equipment (e.g., gateways, set-top-boxes, digital video recorders, modems, etc.) metrics may include forward data carrier reception level, reverse data carrier reception level, a count of reverse data carrier retransmission operations, a measurement of a reverse data channel transmission level, a quadrature amplitude modulation (QAM) receive signal level, a QAM signal-to-noise ratio, a forward data channel signal-to-noise ratio, a count of QAM or forward data channel error rate (e.g., errors per second) over a period of time (e.g., a 24-hour period), an out-of-band signal-to-noise ratio or signal level quality, an Internet Protocol (IP) network reentry count, an indication of whether a control channel is locked, an inband signal quality or signal-to-noise ratio, video on demand (VOD) error count, aborted upstream message count, an upstream transmit level, a long-term error count delta, a count of forward error correction (FEC) errors corrected, a count of uncorrectable FEC errors, a tuner signal-to-noise ratio or automatic gain control level, a count of a number of lost locks, a count of program count errors, a count of presentation time stamp errors, and a tuner power level.

For computing devices that are further upstream from a user premises (e.g., VOD servers, content delivery servers, etc.), the metrics may include a count of the number of errors in the serviced user premises equipment, a count of a number of duplicate active devices, a count of a number of non-responding devices, a count of a number of unpaired cable cards, and a count of VOD errors.

The summary here is not an exhaustive listing of the novel features described herein, and is not limiting of the claims. These and other features are described in greater detail below.

BRIEF DESCRIPTION OF THE DRAWINGS

These and other features, aspects, and advantages of the present disclosure will become better understood with regard to the following description, claims, and drawings. The present disclosure is illustrated by way of example, and not limited by, the accompanying figures in which like numerals indicate similar elements.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be used, and structural and functional modifications may be made, without departing from the scope of the present disclosure.

Figure 1:
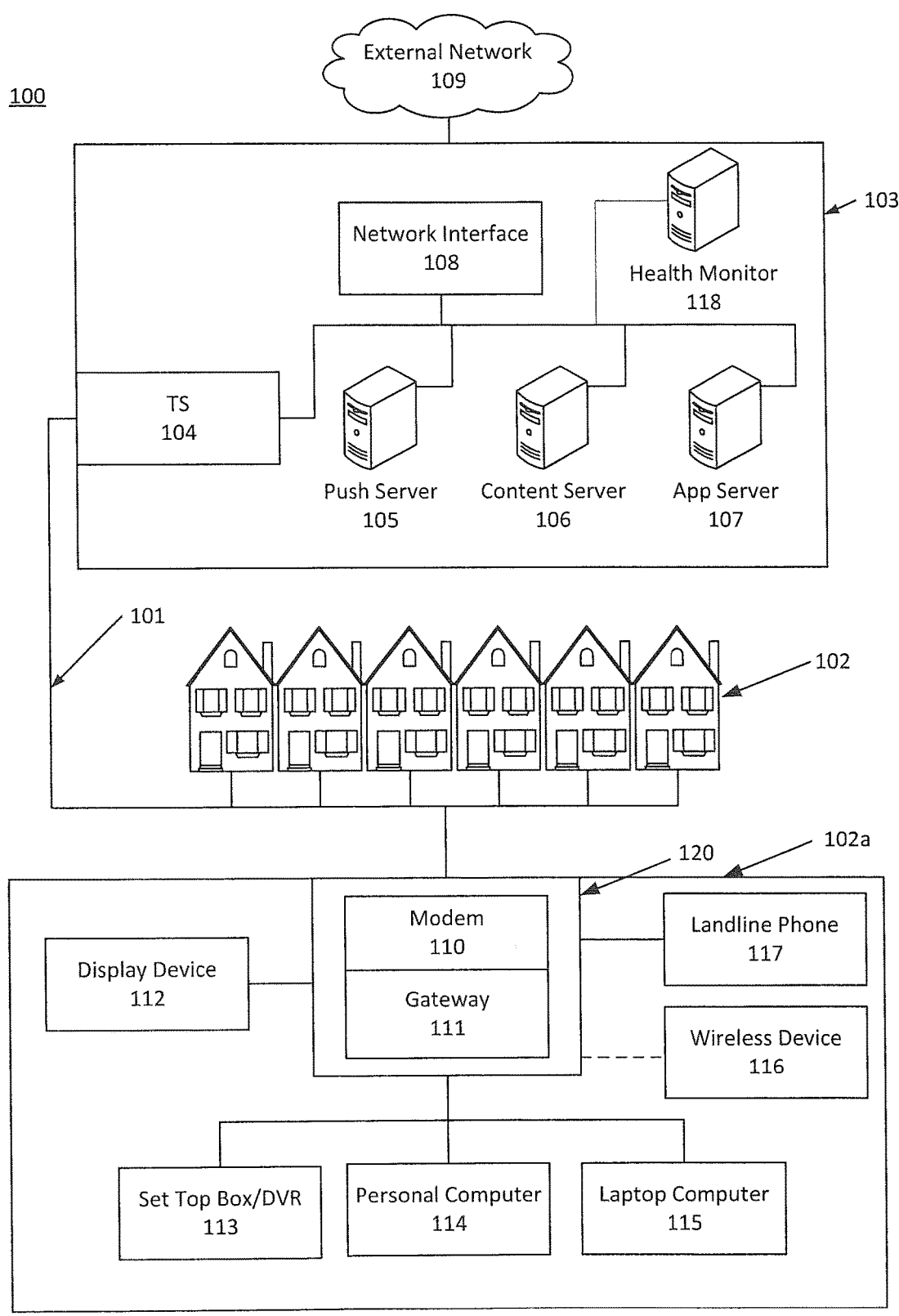
FIG. 1 illustrates an example communication network on which various features described herein may be used.

FIG. 1 illustrates an example communication network 100 on which many of the various features described herein may be implemented. Network 100 may be any type of information distribution network, such as satellite, telephone, cellular, wireless, etc. One example may be an optical fiber network, a coaxial cable network, or a hybrid fiber/coax distribution network. Such networks 100 use a series of interconnected communication links 101 (e.g., coaxial cables, optical fibers, wireless, etc.) to connect multiple premises 102 (e.g., businesses, homes, consumer dwellings, etc.) to a local office or headend 103. The local office 103 may transmit downstream information signals onto the links 101, and each premises 102 may have a receiver used to receive and process those signals.

There may be one link 101 originating from the local office 103, and it may be split a number of times to distribute the signal to various premises 102 in the vicinity (which may be many miles) of the local office 103. The links 101 may include components not illustrated, such as splitters, filters, amplifiers, etc. to help convey the signal clearly, but in general each split introduces a bit of signal degradation. Portions of the links 101 may also be implemented with fiber-optic cable, while other portions may be implemented with coaxial cable, other lines, or wireless communication paths.

The local office 103 may include an interface, such as a termination system (TS) 104. In a hybrid fiber-coaxial network, the interface 104 may be a cable modem termination system (CMTS), which may be a computing device configured to manage communications between devices on the network of links 101 and backend devices such as servers 105-107 (to be discussed further below). The interface 104 may be as specified in a standard, such as the Data Over Cable Service Interface Specification (DOCSIS) standard, published by Cable Television Laboratories, Inc. (a.k.a. CableLabs), or it may be a similar or modified device instead. The interface 104 may be configured to place data on one or more downstream frequencies to be received by modems at the various premises 102, and to receive upstream communications from those modems on one or more upstream frequencies.

The local office 103 may also include one or more network interfaces 108, which can permit the local office 103 to communicate with various other external networks 109. These networks 109 may include, for example, networks of Internet devices, telephone networks, cellular telephone networks, fiber optic networks, local wireless networks (e.g., WiMAX), satellite networks, and any other desired network, and the network interface 108 may include the corresponding circuitry needed to communicate on the external networks 109, and to other devices on the network such as a cellular telephone network and its corresponding cell phones.

As noted above, the local office 103 may include a variety of servers 105-107 that may be configured to perform various functions. For example, the local office 103 may include a push notification server 105. The push notification server 105 may generate push notifications to deliver data and/or commands to the various premises 102 in the network (or more specifically, to the devices in the premises 102 that are configured to detect such notifications). The local office 103 may also include a content server 106. The content server 106 may be one or more computing devices that are configured to provide content to users at their premises. This content may be, for example, video on demand movies, television programs, songs, text listings, etc. The content server 106 may include software to validate user identities and entitlements, to locate and retrieve requested content, to encrypt the content, and to initiate delivery (e.g., streaming) of the content to the requesting user(s) and/or device(s).

The local office 103 may also include one or more application servers 107. An application server 107 may be a computing device configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting television program listings information and generating a data download for electronic program guide listings. Another application server may be responsible for monitoring user viewing habits and collecting that information for use in selecting advertisements. Yet another application server may be responsible for formatting and inserting advertisements in a video stream being transmitted to the premises 102. Although shown separately, one of ordinary skill in the art will appreciate that the push server 105, content server 106, and application server 107 may be combined. Further, here the push server 105, content server 106, and application server 107 are shown generally, and it will be understood that they may each contain memory storing computer executable instructions to cause a processor to perform steps described herein and/or memory for storing data.

An example premises 102a, such as a home, may include an interface 120. The interface 120 can include any communication circuitry needed to allow a device to communicate on one or more links 101 with other devices in the network. For example, the interface 120 may include a modem 110, which may include transmitters and receivers used to communicate on the links 101 and with the local office 103. The modem 110 may be, for example, a coaxial cable modem (for coaxial cable lines 101), a fiber interface node (for fiber optic lines 101), twisted-pair telephone modem, cellular telephone transceiver, satellite transceiver, local wi-fi router or access point, or any other desired modem device. Also, although only one modem is shown in FIG. 1, a plurality of modems operating in parallel may be implemented within the interface 120. Further, the interface 120 may include a gateway interface device 111. The modem 110 may be connected to, or be a part of, the gateway interface device 111. The gateway interface device 111 may be a computing device that communicates with the modem(s) 110 to allow one or more other devices in the premises 102a, to communicate with the local office 103 and other devices beyond the local office 103. The gateway 111 may be a set-top box (STB), digital video recorder (DVR), computer server, or any other desired computing device. The gateway 111 may also include (not shown) local network interfaces to provide communication signals to requesting entities/devices in the premises 102a, such as display devices 112 (e.g., televisions), additional STBs or DVRs 113, personal computers 114, laptop computers 115, wireless devices 116 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA), etc.), landline phones 117 (e.g. Voice over Internet Protocol—VoIP phones), and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11, IEEE 802.15), analog twisted pair interfaces, Bluetooth interfaces, and others.

The various devices in the system may be configured to perform health monitoring services. For example, the gateway 111 and modem 110 may monitor its own performance metrics (examples described further below) and may report its own performance metrics to a performance monitoring computing device 118. The performance monitoring computing device 118 may collect performance metric information from a variety of devices in the system (e.g., devices at the various premises 102), and may perform evaluations on the various metrics to develop an assessment of an overall health of a particular device or portion of a network.

Figure 2:
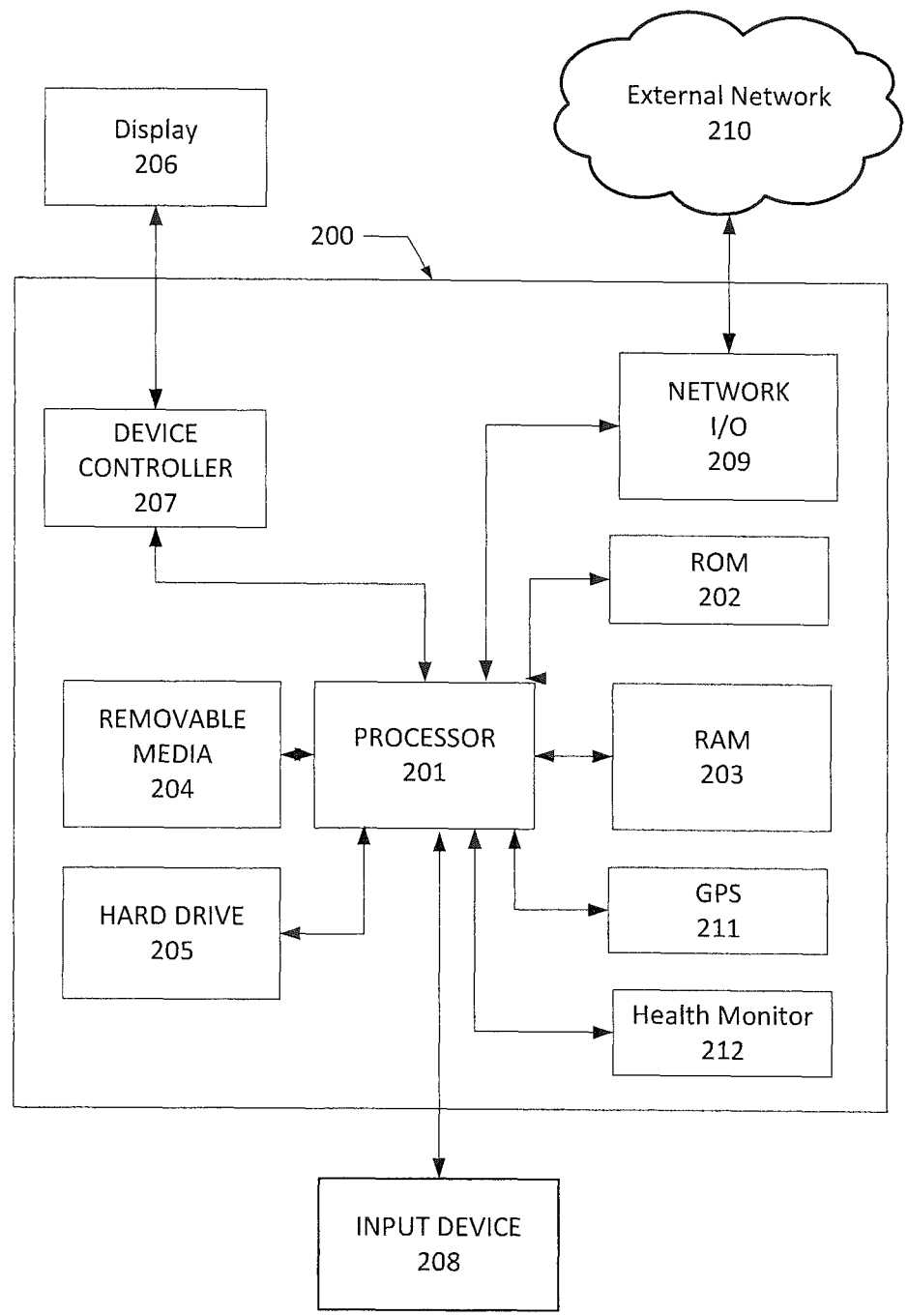
FIG. 2 illustrates an example computing device that can be used to implement any of the methods, servers, entities, and computing devices described herein.

FIG. 2 illustrates general hardware elements that can be used to implement any of the various computing devices discussed herein. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), floppy disk drive, or any other desired storage medium. Instructions may also be stored in an attached (or internal) hard drive 205. The computing device 200 may include one or more output devices, such as a display 206 (e.g., an external television), and may include one or more output device controllers 207, such as a video processor. There may also be one or more user input devices 208, such as a remote control, keyboard, mouse, touch screen, microphone, etc. The computing device 200 may also include one or more network interfaces, such as a network input/output (I/O) circuit 209 (e.g., a network card) to communicate with an external network 210. The network input/output circuit 209 may be a wired interface, wireless interface, or a combination of the two. In some embodiments, the network input/output circuit 209 may include a modem (e.g., a cable modem), and the external network 210 may include the communication links 101 discussed above, the external network 109, an in-home network, a provider's wireless, coaxial, fiber, or hybrid fiber/coaxial distribution system (e.g., a DOCSIS network), or any other desired network. Additionally, the device may include a location-detecting device, such as a global positioning system (GPS) microprocessor 211, which can be configured to receive and process global positioning signals and determine, with possible assistance from an external server and antenna, a geographic position of the device. FIG. 2 illustrates a health monitor 212 component, which may be a dedicated processor configured to perform the various health monitoring functions described herein, or it may be implemented by the device's main processor 201.

The FIG. 2 example is a hardware configuration, although the illustrated components may be implemented as software as well. Modifications may be made to add, remove, combine, divide, etc. components of the computing device 200 as desired. Additionally, the components illustrated may be implemented using basic computing devices and components, and the same components (e.g., processor 201, ROM storage 202, display 206, etc.) may be used to implement any of the other computing devices and components described herein. For example, the various components herein may be implemented using computing devices having components such as a processor executing computer-executable instructions stored on a computer-readable medium, as illustrated in FIG. 2. Some or all of the entities described herein may be software based, and may co-exist in a common physical platform (e.g., a requesting entity can be a separate software process and program from a dependent entity, both of which may be executed as software on a common computing device).

One or more aspects of the disclosure may be embodied in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects of the disclosure, and such data structures are contemplated within the scope of computer executable instructions and computer-usable data described herein.

Figure 3:
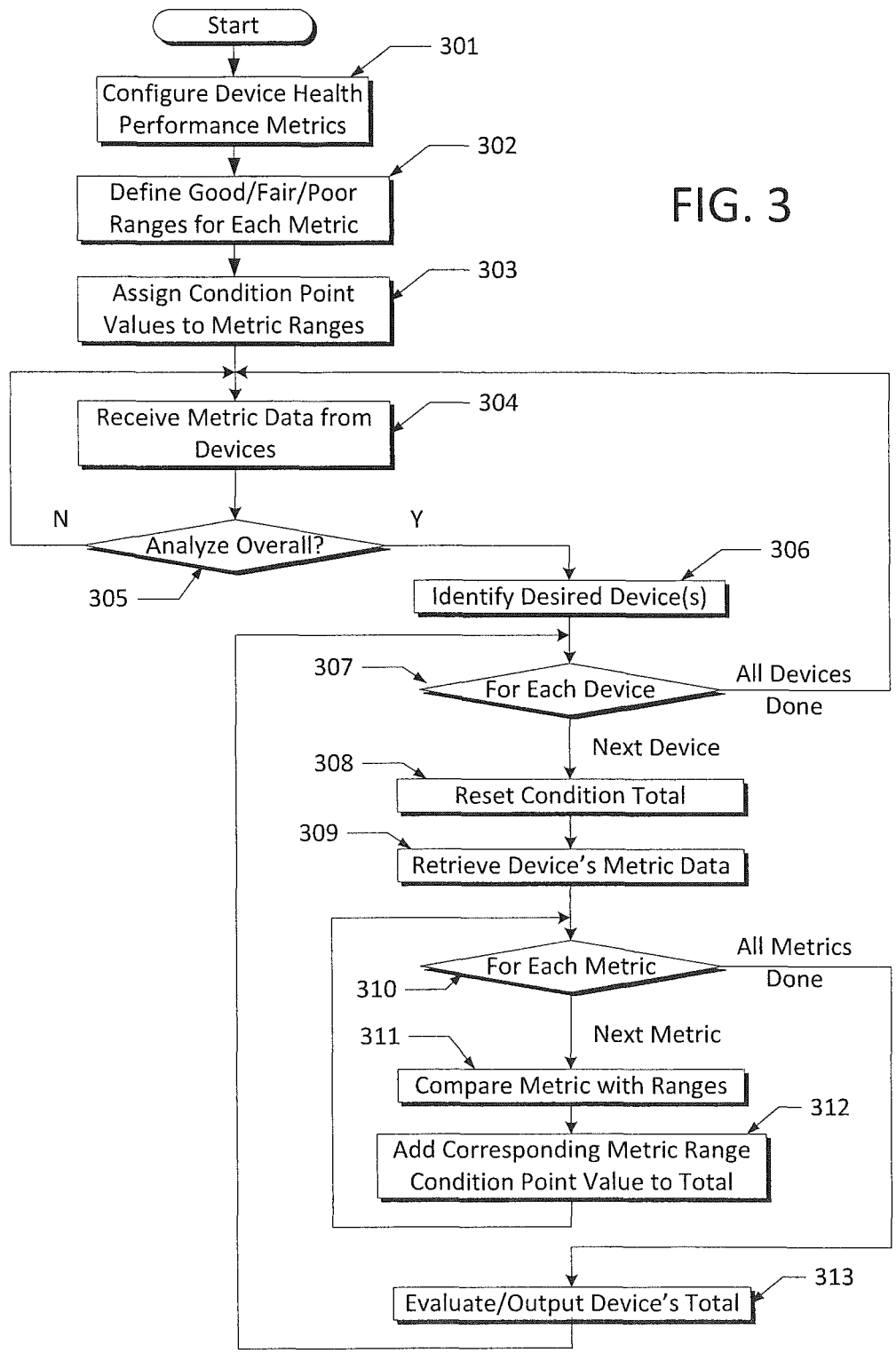
FIG. 3 illustrates an example process for monitoring computing device health.

FIG. 3 illustrates an example performance or health monitoring process that may be performed by the health monitor 118. In step 301, the health monitor 118 may be configured to identify the various device performance metrics available for the devices whose health or performance is being monitored. The performance metrics may vary depending on device type. For example, one model of a computing device may report a first set of performance metrics, while a different model reports different performance metrics, and the monitoring device 118 may be configured to process the metrics for the different models differently. The metrics may be measured and reported by the devices themselves, either periodically or on request by the monitor 118, or they may be metrics measured by the monitor 118 itself (or by any other device in the system). The configuration in step 301 may include establishing the parameters and conditions by which the performance metrics will be obtained. The monitored devices may be programmed to report some performance metrics according to a predetermined schedule (e.g., one metric is reported every five minutes, another is reported once a day, etc.), and may be configured with the destination address to which they should be sending their reports. The configuration may also include programming the monitoring device 118 to collect certain performance metrics as well (e.g., the device 118 may make certain measurements once a day, and other measurements every minute, etc.). The various reporting details for the different performance metrics are explained in greater detail below.

In step 302, the possible range of values that a metric may provide may be divided into a plurality of predefined ranges, corresponding to different levels of performance. For example, one metric may have three ranges corresponding to good performance, less-than-good-but-acceptable performance (e.g., OK or fair performance), and poor performance. As will be described further below, these ranges may be used to determine whether a particular performance metric is indicative of a problem with the device being monitored. The performance metrics may be based on a variety of measured characteristics, such as signal dB loss.

In step 303, each of the predefined ranges of the performance metrics (e.g., the good, OK and poor ranges for each metric) may be assigned a condition value. In some embodiments, a metric in the good range may be assigned zero points, a metric in the OK range may be assigned five points, and a metric in the poor range may be assigned ten points. In alternative embodiments, the point values may be varied if, for example, one performance metric is determined to be a better (or worse) indicator of a problem with the device than other performance metrics.

Examples of the performance metrics that may be used, along with their ranges and condition point values, are described below. The various metrics may refer to values measured and reported by the devices being monitored (e.g., user premises devices, STB/DVR 113, etc.), or by other devices in the local office 103 (or beyond). The various values indicated may refer to measurements over a predetermined period of time, such as a 24-hour period.

On metric may be an Out-of-Band (OOB) signal-to-noise ratio (SNR) quality. This metric may be measured by a device being monitored, such as a user premises computing device, and may measure the signal-to-noise ratio quality for an out-of-band signal received at the device. An out-of-band signal may be one that is transmitted from the local office 103 using a data transmission frequency or band that is different from a frequency or band used to transmit a video signal. In the example of a video reception device, such as a set-top-box (STB) or digital video recorder (DVR), the in-band signals may be the frequencies or digital channels carrying the video services that a user may view, and the out-of-band signals may be the other frequencies or digital channels available in the transmission media (e.g., communication link 101). The user premises device (e.g., STB 113) may measure the signal-to-noise ratio quality of one or more received out-of-band signals received over the link 101, and may report this performance metric to the health monitoring device 118. The metric ranges for this performance metric may be as indicated in the table below (the "poor," "fair" and "good" OOB SNR Quality values may be those reported by the various devices themselves):

| Metric Range | OOB SNR Quality | Condition Point Value |
|---|---|---|
| Poor | Poor | 10 |
| Fair | Fair | 5 |
| Good | Good | 0 |

Another performance metric may be an OOB signal level quality. This metric may measure how strong the out-of-band signal is when it is received at a user premises device. This metric's ranges may be as indicated in the table below (the "low," "medium" and "high" OOB Signal Level quality values may be those reported by the various devices themselves):

| Metric Range | OOB Signal Level Quality | Condition Point Value |
|---|---|---|
| Poor | Low | 10 |
| Fair | Med | 5 |
| Good | High | 0 |

A similar metric may be established for in-band signal quality, using "poor", "fair" and "good" values reported by the devices:

| Metric Range | In-Band Signal Quality | Condition Point Value |
|---|---|---|
| Poor | Poor | 10 |
| Fair | Fair | 5 |
| Good | Good | 0 |

Another performance metric may be a count of the number of times that an Internet Protocol network reentry has been performed since the monitored device rebooted. The IP network reentry may involve the monitored device requesting a new IP address, or otherwise re-establishing connectivity with an IP server at the local office 103. This metric may be given ranges as indicated below:

| Metric Range | IP Network Re-entry Count | Condition Point Value |
|---|---|---|
| Poor | >10 | 10 |
| Fair | 6-9 | 5 |
| Better | 1-5 | 2 |
| Good | 0 | 0 |

Another performance metric may be a determination of whether the monitored device is able to successfully tune to (or lock on to) an out-of-band control channel that may be used to send downstream control commands from the local office 103 to the monitored device (e.g., STB 113). This performance metric might only have two ranges. If the channel is locked, then the condition point value is 0 points. If the channel is not locked, then the condition point value is 10 points.

Another performance metric may be a count of a number of video on demand (VOD) errors that have occurred in a predetermined time period (e.g., a 24-hour period). A VOD error may occur when data connectivity is lost or interrupted during a user's VOD session, and the user's monitored device (e.g., a STB) issues a repeat request for the content. The VOD error may alternatively be an ordering error, in which the user's initial request for a VOD content fails to successfully get through to the local office 103, and the STB resorts to repeating the VOD order request. Certain types of VOD errors, however, may be excluded from this count. For example, errors that were due to a user's account having billing problems or insufficient funds may be excluded from this count, and the count may only include errors that indicate the device was unable to tune or communicate upstream. The ranges for VOD errors may be less tolerant than other types of metrics, and may be as indicated below:

| Metric Range | VOD Error Count | Condition Point Value |
|---|---|---|
| Poor | >1 | 10 |
| Fair | 1 | 5 |
| Good | 0 | 0 |

The error rate may differ for different types of user devices, such as different STBs or DVRs. For example, a different STB type may have a range as follows:

| Metric Range | VOD Errors | Condition Point Value |
|---|---|---|
| Poor | >2 | 10 |
| Fair | 1-2 | 5 |
| Good | 0 | 0 |

Another performance metric may be a count of a number of upstream interactive messages that the monitored device attempts to send, but which are unsuccessful (e.g., message not acknowledged by the local office 103 within a predetermined waiting period), within a predetermined time period. The metric ranges may be as follows:

| Metric Range | Aborted Upstream Msgs | Condition Point Value |
|---|---|---|
| Poor | >10 | 10 |
| Fair | 5-10 | 5 |
| Good | <5 | 0 |

Another metric may be an Inband SNR level. Similar to the OOB SNR Quality metric discussed above, the Inband SNR level may be a measure of the signal-to-noise ratio of an inband signal. The metric ranges may be as follows:

| Metric Range | Inband SNR Level | Condition Point Value |
|---|---|---|
| Poor | <28 | 15 |
| Fair | 28-30 | 11 |
| Moderate | >30 and ≤32 | 8 |
| Acceptable | >32 and ≤34 | 5 |

-continued

| Metric Range | Inband SNR Level | Condition Point Value |
|---|---|---|
| Better | >34 and ≤36 | 2 |
| Good | >36 | 0 |

Another metric may be an upstream transmit level, which may refer to a transmit strength used by the monitored device to send upstream signals to the local office 103. The ranges may be as follows:

| Metric Range | Upstream Transmit Level | Condition Point Value |
|---|---|---|
| Poor | <20 or >61 | 15 |
| Fair | 20-25 or 56-61 | 10 |
| Moderate | 26-30 or 51-55 | 5 |
| Good | 31-50 | 0 |

Another metric may be a calculation of the long-term error count delta for the monitored device. As noted above, the device may report errors, such as the VOD errors, and the monitoring device 118 may monitor the error reports. The monitoring device 118 may determine whether the error rate appears to be increasing at an unusual rate by comparing, for example, a device's error count from one day with the device's error count from a preceding day. The metric ranges may be as follows:

| Metric Range | Long Term Error Delta | Condition Point Value |
|---|---|---|
| Poor | >1001 | 25 |
| Undesirable | 201-1000 | 20 |
| Fair | 101-200 | 15 |
| Moderate | 51-100 | 10 |
| Better | 1-50 | 5 |
| Good | 0 | 0 |

The metrics above may be ones used for a first type of user device, such as set-top-boxes from Motorola, Inc. As indicated in the tables above, some metrics are assigned a higher condition point value than others. This may be done to weight or emphasize the importance of one metric over another, since some metrics may be better indicators of actual problems in the network than others.

Another set of metrics may be used for a different device, such as set-top-boxes from Cisco Systems, Inc. One metric may be a report of the forward data channel (FDC) reception level, as noted by the monitored device. The FDC reception level may refer to the device's ability to receive a data channel from the local office 103, and may be a numeric value reported by the device. The ranges may be as follows:

| Metric Range | FDC Receive Level | Condition Point Value |
|---|---|---|
| Poor | n/a | n/a |
| Fair | ≥8 or ≤−8 | 5 |
| Good | >−8 and <8 | 0 |

In the example above, the lowest range may simply be ignored. This may be useful if the metric is not a particularly good indicator of an actual device problem.

A similar metric may be used for reverse data channel (RDC) transmit level. The RDC transmit level may be a numeric value reported by the device referring to the transmission strength used by the monitored device to successfully transmit data back up to the local office 103, and the ranges for this metric may be as indicated below:

| Metric Range | RDC Transmit Level | Condition Point Value |
|---|---|---|
| Poor | ≥57 or ≤25 | 10 |
| Fair | ≥54 and <57 | 5 |
| Good | >25 or <54 | 0 |

Another metric may be RDC retransmissions. This may be the same as the aborted upstream messages metric discussed above, and may count the number of times that the monitored device has to resend a transmission to the local office 103 in a predetermined time period. The metric ranges may be as follows, which may be different due to the differences in the monitored device types:

| Metric Range | RDC Retransmissions | Condition Point Value |
|---|---|---|
| Poor | n/a | n/a |
| Fair | >0 | 5 |
| Good | 0 | 0 |

Another metric may be a quadrature amplitude modulation (QAM) receive level. This metric may be the same as the OOB or Inband levels discussed above, and may refer to the strength at which an incoming signal from the local office 103 (e.g., a QAM data channel) is received at the monitored device. The metric ranges may be as follows:

| Metric Range | QAM Rx Level | Condition Point Value |
|---|---|---|
| Poor | ≥15 or ≤−15 | 10 |
| Fair | >−15 and ≤−10 Or ≥10 and <15 | 5 |
| Good | >−10 and <10 | 0 |

Another metric may be a QAM SNR, which may be a measure of the signal-to-noise ratio of a downstream QAM signal as it is received by the monitored device. The ranges for this metric may be as follows:

| Metric Range | QAM SNR | Condition Point Value |
|---|---|---|
| Poor | <29 | 10 |
| Fair | >29 and ≤33 | 5 |
| Good | >33 | 0 |

Another metric may be a forward data channel SNR, which may be a measure of the signal-to-noise ratio of a downstream data channel from the local office 103 to the monitored device (e.g., STB 113). The ranges for this metric may be as follows:

| Metric Range | FDC SNR | Condition Point Value |
|---|---|---|
| Poor | <28 | 10 |
| Fair | n/a | n/a |
| Good | >28 | 0 |

As evident from the table above, this metric omits the fair range, and provides a stronger indication of an error if the forward data channel signal-to-noise ratio falls below 28.

Another metric may be a count of a rate of FDC errors that occur in a predetermined time period (e.g., errors per second average over the past 24 hours). An error on the forward data channel may occur whenever, for example, data from the local office 103 is sent to the monitored device, but not successfully received (and may be subsequently resent by the local office 103). The ranges for this metric may be as follows:

| Metric Range | FDC Error Rate | Condition Point Value |
|---|---|---|
| Poor | >10 | 10 |
| Fair | 1-10 | 5 |
| Good | 0 | 0 |

Another set of performance metrics may be used in a third type of monitored device, such as set-top boxes following the DOCSIS (Data Over Cable Service Interface Specification) standard. One such metric may be a tuner SNR, which is a measure of the signal-to-noise ratio of a signal received by the DOCSIS STB tuner. The ranges for this metric may be as follows:

| Metric Range | Tuner SNR | Condition Point Value |
|---|---|---|
| Poor | n/a | n/a |
| Fair | >10 | 5 |
| Good | 0-10 | 0 |

Another metric may involve the need for forward error correction (FEC) in receiving data by the monitored device. An FEC Corrected metric may be tracked to determine how many errors in a predetermined time period (e.g., 24 hours) were corrected using FEC. A similar FEC Uncorrectable metric may be tracked to determine how many errors were uncorrectable using FEC. The ranges for both of these metrics may be as follows:

| Metric Range | FEC Corrected/Uncorrectable | Condition Point Value |
|---|---|---|
| Poor | n/a | n/a |
| Fair | >1000 | 5 |
| Good | 0-1000 | 0 |

Another metric may be a Tuner AGC metric that tracks the level of automatic gain control being used by the monitored device's tuner to output signals received from the local office 103 to local devices (e.g., a television). The metric may be reported as a numerical value by the monitored device, and the range for this metric may be as follows:

| Metric Range | Tuner AGC | Condition Point Value |
|---|---|---|
| Poor | >50 | 10 |
| Fair | 11-50 | 5 |
| Good | <=10 | 0 |

Another metric may be a Lost Lock count of the number of times the device's tuner loses its frequency lock on a carrier frequency sent from the local office 103. The range for this metric may be as follows:

| Metric Range | Lost Locks | Condition Point Value |
|---|---|---|
| Poor | >100 | 10 |
| Fair | 11-100 | 5 |
| Good | <=10 | 0 |

Another metric may be a count of the number of times the monitored device experiences a program clock reference (PCR) error, which can occur if incoming clock signals are not properly received. A similar metric may be used for program time stamp (PTS) errors, which can occur if packet time stamps in a received video stream (e.g., an MPEG stream) are not received in the proper timing sequence. The ranges for both of these metrics may be as follows:

| Metric Range | PCR/PTS Errors | Condition Point Value |
|---|---|---|
| Poor | >50 | 10 |
| Fair | 11-50 | 5 |
| Good | <=10 | 0 |

Another metric may be based on a power level of a received in-band signal. The metric may be a numeric value reported by the monitored device, and the range for this Tuner Power Level metric may be as follows:

| Metric Range | Tuner Power Level | Condition Point Value |
|---|---|---|
| Poor | $\geq 30$ or $\leq -30$ | 10 |
| Fair | $\geq 20$ and $<30$ Or $\leq -20$ and $>-30$ | 5 |
| Good | $>-20$ and $<20$ | 0 |

The three sets of parameters discussed above have been discussed in context of supporting three different types of computing devices, which may be end-user consumer devices (e.g., a Motorola STB, a Cisco STB and a DOCSIS STB). The local office 103 may also have corresponding servers (e.g. a content server 106) may be a node communicating with various devices at multiple premises 102, and those nodes may also have aggregated metric data. There may be, however, different sets of ranges for the different types of devices. For example, the first type of device discussed above may have an STB Aggregate metric that identifies the overall number of errors occurring among the first type of device serviced by the node. The ranges for this metric may be as follows:

| Metric Range | STB Aggregate | Condition Point Value |
|---|---|---|
| Poor | >20 | 10 |
| Fair | 14-20 | 5 |
| Good | 0-14 | 0 |

Another metric may identify a total count of trouble tickets involving video quality or delivery. A trouble ticket may be created each time a customer reports a complaint that needs resolution, and this metric may focus on the trouble tickets that deal with video quality or delivery—other types of trouble tickets for other types of complaints may be ignored The range for this metric may be as follows:

| Metric Range | Trouble Ticket Count | Condition Point Value |
| --- | --- | --- |
| Poor | >10 | Ticket Count |
| Fair | 1-10 | Ticket Count |
| Good | 0 | 0 |

Note that in this example, the condition point value may be equal to the count of the number of trouble tickets.

Similar metrics may be used for the other two device types discussed above. For the second device type, the metric ranges may be as follows:

| Metric Range | STB Aggregate | Condition Point Value |
| --- | --- | --- |
| Poor | >18 | 10 |
| Fair | 14-18 | 5 |
| Good | 0-14 | 0 |

| Metric Range | Trouble Ticket Count | Condition Point Value |
| --- | --- | --- |
| Poor | >10 | Ticket Count |
| Fair | 1-10 | Ticket Count |
| Good | 0 | 0 |

And the third device type may have metric ranges as follows:

| Metric Range | STB Aggregate | Condition Point Value |
| --- | --- | --- |
| Poor | >20 | 10 |
| Fair | 11-20 | 5 |
| Good | 0-10 | 0 |

| Metric Range | Trouble Ticket Count | Condition Point Value |
| --- | --- | --- |
| Poor | >10 | Ticket Count |
| Fair | 1-10 | Ticket Count |
| Good | 0 | 0 |

The health monitoring device 118 may also track overall downstream plant health from the local office 103. At the local office 103, the device 118 may keep track of the number of duplicate active STBs in the network. A duplicate active STB (or other device) may be detected when, for example, two different devices attempt to connect for service using the same device identifier, or when requests using the same device identifier are received from two different locations. Some amount of movement may be expected (e.g., customers who move to a new neighborhood), but excessive movement may indicate a possible problem. The metric may be measured as a percentage of the devices being monitored, and the ranges for this metric may be as follows:

| Metric Range | Duplicate Active Boxes | Condition Point Value |
| --- | --- | --- |
| Poor | >2% | 10 |
| Fair | 1-2% | 5 |
| Good | <1% | 0 |

Another metric may be an STB Aggregate metric that is a total of all device errors across the various device types.] This STB Aggregate metric may have the following ranges:

| Metric Range | STB Aggregate | Condition Point Value |
| --- | --- | --- |
| Poor | >30 | 10 |
| Fair | 10-30 | 5 |
| Good | 0-9 | 0 |

Another metric may be a total count of the number of devices (e.g., STBs) that do not respond to polling requests sent from the local office 103. This metric may be measured as a percentage of the monitored devices, and may have the following ranges:

| Metric Range | Non Responders | Condition Point Value |
| --- | --- | --- |
| Poor | >5% | 10 |
| Fair | 1-5% | 5 |
| Good | <1% | 0 |

Another metric may be a total count of the number of unpaired cable cards communicating on the network with the local office 103. A cable card may be a computing device that is authorized by a content provider (e.g., a cable television company or other service provider), and when the card is inserted into a corresponding receptacle in a television or other device, the card allows the television or other device to be authenticated to access the content provider's content. When the television or other device initiates access to the content provider, the content provider may store information identifying a pairing of the card with the television or other device (e.g., the card's host device). An unpaired card may refer to communications received from a card having no previously-recognized paired device. The metric may be measured as a percentage of the measured devices, and the ranges for this metric may be as follows:

| Metric Range | Unpaired Cards | Condition Point Value |
| --- | --- | --- |
| Poor | >2% | 10 |
| Fair | >1 to 2% | 5 |
| Good | 0-1% | 0 |

The example metrics above, and their respective ranges, are merely examples. Other metrics and ranges may be used as well, if desired, and different ranges may be established for different types of devices.

After the metric ranges and condition point values are established, the health monitoring device 118 may being to receive metric data from the various devices in step 304. The reception of the various metrics may occur through a variety of mechanisms. First, the monitored devices themselves (e.g., the user premises devices, STB/DVR 113, gateway 111, etc.) may track some of the performance metrics themselves, and may periodically (or upon request from the health monitoring device 118) transmit a message to the health monitoring device 118, the message containing their respective performance metric data and identifications of the device(s) whose performance data is being sent. The performance metrics may alternatively be gathered by the health monitoring device 118 by polling other devices, or by directly measuring performance. This performance metric data may be stored in a memory, such as hard drive 205, by the health monitoring device 118.

In step 305, the health monitoring device 118 may determine whether it is time to analyze the overall health of one or more monitored devices. The health monitoring device may be configured to determine the overall health of a monitored device according to a predetermined schedule (e.g., once per 24-hour period, at certain time(s) of the day, etc.), or upon receipt of a predetermined command (e.g., a user at the local office 103 may send a command requesting that the device 118 check the overall health of a particular monitored device.

If it is time to analyze the overall health of a monitored device, then in step 306, the health monitoring device 118 may determine which devices are to be analyzed for overall health. This determination can also be based on a schedule (e.g., each device is checked daily at a scheduled time), or upon specific request (e.g., an administrator may send a command requesting a check of a particular device identified in the command request).

In step 307, the health monitoring device 118 may begin a loop that is performed for each of the devices to be analyzed. For each device, in step 308, the health monitoring device 118 may begin by resetting a condition total to zero. The condition total, as will be discussed below, may be used to keep a running total of the various condition point values based on the device's performance metric data and the ranges discussed above.

In step 309, the health monitoring device 118 may retrieve the performance metric data for the device being analyzed, and in step 310, the health monitoring device 118 may begin a loop for each performance metric stored for the monitored device that is being analyzed.

In step 311, the health monitoring device 118 may compare the device's performance metric with the metric's corresponding ranges to identify the corresponding condition point value. In step 312, the health monitoring device 118 may add the identified condition point value to the condition total. The health monitoring device 118 may return to step 310 to continue the loop until all of the analyzed device's metrics have been processed, and when all of those metrics have been processed, the health monitoring device may proceed to step 313. In step 313, the health monitoring device may evaluate the analyzed device's condition point total, and compare it to a response scale to determine what steps should be taken. The response scale may be device-specific, and may indicate the actions to be taken if the condition point value reaches a predefined value. For example, the response scale may indicate the following point thresholds and corresponding treatment:

| Condition Point Total | Response |
| --- | --- |
| 0-50 | Nothing |
| >50 | Transmit alert message to administrator, identifying the analyzed device and providing its performance metrics |

Further escalations may involve forwarding the issue to local engineering for analysis, and sending personnel to the customer's premises to investigate the issue.

The health monitoring device 118 may send a message to an administrator, informing the administrator of the total point value for the monitored device. Alternatively, the device 118 may signal an alarm if the total point value is high enough, as indicated by the response scale, to warrant an alarm.

The example above in step 312 adds the various condition point values to generate the condition point total. Addition, however, is just one example of how the various condition point values may be combined to result in a combined condition point value. The various individual condition point values may be combined in other ways, such as through multiplication by weighting, to yield the combined condition point value.

In the example embodiments are described above, the various features and steps may be combined, divided, omitted, rearranged, revised and/or augmented in any desired manner, depending on the specific outcome and/or application. Various alterations, modifications, and improvements will readily occur to those skilled in art. Such alterations, modifications, and improvements as are made obvious by this disclosure are intended to be part of this description though not expressly stated herein, and are intended to be within the spirit and scope of the disclosure. Accordingly, the foregoing description is by way of example only, and not limiting. This patent is limited only as defined in the following claims and equivalents thereto.

What is claimed is:

1. A method, comprising:
    determining, by one or more computing devices, a plurality of performance metrics for one or more monitored computing devices;
    determining, by the one or more computing devices and for each of the plurality of performance metrics, a first metric range and a second metric range;
    determining, by the one or more computing devices and for each of the plurality of performance metrics, a first condition point value corresponding to the first metric range determined for that performance metric and a second condition point value corresponding to the second metric range determined for that performance metric;
    for each performance metric of the plurality of performance metrics:
        determining, by the one or more computing devices, a measured value for that performance metric for a first monitored computing device of the one or more monitored computing devices;
        when the measured value is within a first metric range determined for that performance metric, assigning, by the one or more computing devices, a first condition point value determined for that first metric range to the first monitored computing device; and
        when the measured value is within a second metric range determined for that performance metric, assigning, by the one or more computing devices, a second condition point value determined for that second metric range to the first monitored computing device; and
    combining each condition point value assigned to the first monitored computing device to yield a first combined condition point value for the first monitored computing device.

2. The method of claim 1, wherein the first and second metric ranges determined for each of the plurality of performance metrics correspond to poor and good performance of the first monitored computing device, respectively, and the method further comprises:
    determining a third metric range for fair operation for each of the performance metrics, and further using the third metric range when combining each condition point value assigned to the first monitored computing device.

3. The method of claim 1, further comprising:
for each performance metric of the plurality of performance metrics:
determining, by the one or more computing devices, a measured value for that performance metric for a second monitored computing device of the one or more monitored computing devices;
when the measured value is within the first metric range determined for that performance metric, assigning, by the one or more computing devices, the first condition point value determined for that first metric range to the second monitored computing device; and
when the measured value is within the second metric range determined for that performance metric, assigning, by the one or more computing devices, the second condition point value determined for that second metric range to the second monitored computing device; and
combining each condition point value assigned to the second monitored computing device to yield a second combined condition point value for the second monitored computing device.

4. The method of claim 1, further comprising:
comparing the first combined condition point value to a threshold value, and
based on a result of the comparing, signaling an alarm.

5. The method of claim 1, wherein one of the performance metrics is a forward or reverse data carrier reception level, for which the assigning comprises assigning a corresponding forward or reverse data carrier reception level condition point value to the first monitored computing device when combining each condition point value assigned to the first monitored computing device.

6. The method of claim 1, wherein one of the performance metrics is a forward data carrier or quadrature amplitude modulation (QAM) errors-per-second value, for which the assigning comprises assigning a corresponding errors-per-second condition point value to the first monitored computing device when combining each condition point value assigned to the first monitored computing device.

7. The method of claim 1, wherein one of the performance metrics is an upstream transmit level, for which the assigning comprises assigning a corresponding upstream transmit level condition point value to the first monitored computing device when combining each condition point value assigned to the first monitored computing device.

8. The method of claim 1, wherein one of the performance metrics is an automatic gain control level, for which the assigning comprises assigning a corresponding automatic gain control condition point value to the first monitored computing device when combining each condition point value assigned to the first monitored computing device.

9. The method of claim 1, wherein one of the performance metrics is a count of lost locks, for which the assigning comprises assigning a corresponding lost lock condition point value to the first monitored computing device when combining each condition point value assigned to the first monitored computing device.

10. The method of claim 1, wherein one of the performance metrics is a count of program clock reference errors, for which the assigning comprises assigning a corresponding program clock reference error condition point value to the first monitored computing device when combining each condition point value assigned to the first monitored computing device.

11. The method of claim 1, wherein one of the performance metrics is a count of presentation time stamp errors, for which the assigning comprises assigning a corresponding presentation time stamp error condition point value to the first monitored computing device when combining each condition point value assigned to the first monitored computing device.

12. The method of claim 1, wherein one of the performance metrics is an out-of-band signal quality, for which the assigning comprises assigning a corresponding out-of-band signal quality condition point value to the first monitored computing device when combining each condition point value assigned to the first monitored computing device;
wherein another one of the performance metrics is a network reentry count value, for which the assigning comprises assigning a corresponding network reentry count condition point value to the first monitored computing device when combining each condition point value assigned to the first monitored computing device;
wherein another one of the performance metrics is a video on demand error value, for which the assigning comprises assigning a corresponding video on demand error condition point value to the first monitored computing device when combining each condition point value assigned to the first monitored computing device; and
wherein another one of the performance metrics is an aborted upstream message count value, for which the assigning comprises assigning a corresponding aborted upstream message count condition point value to the first monitored computing device when combining each condition point value assigned to the first monitored computing device.

13. A method, comprising:
determining, by one or more computing devices, first and second metric ranges for a forward or reverse data carrier reception level, and assigning a corresponding forward or reverse data carrier reception level condition point value to each of one or more monitored computing devices when determining a health of each of the one or more monitored computing devices;
determining, by the one or more computing devices, first and second metric ranges for a count of a number of reverse data carrier retransmission operations, and assigning a corresponding reverse data channel retransmission count condition point value to each of the one or more monitored computing devices when determining the health of each of the one or more monitored computing devices;
determining, by the one or more computing devices, first and second metric ranges for a modulation receive level, and assigning a corresponding quadrature amplitude modulation receive level condition point value to each of the one or more monitored computing devices when determining the health of each of the one or more monitored computing devices;
determining, by the one or more computing devices, first and second metric ranges for a forward data carrier errors-per-second value, and assigning a corresponding errors-per-second condition point value to each of the one or more monitored computing devices when determining the health of each of the one or more monitored computing devices; and
combining, by the one or more computing devices and for each of the one or more monitored computing devices, each condition point value assigned to that monitored computing device to yield a combined condition point value for each of the one or more monitored computing devices.

14. The method of claim 13, further comprising:
comparing a first combined condition point value to a threshold; and
based on a result of the comparing, generating an alert indicating that a first monitored computing device associated with the first combined condition point value is in need of service.

15. The method of claim 13, further comprising:
comparing a first combined condition point value to a threshold; and
based on a result of the comparing, transmitting a message indicating that a first monitored computing device associated with the first combined condition point value is in need of service.

16. The method of claim 13, wherein each of the one or more monitored computing devices is part of a network, the method further comprising determining a health of the network based on the combined condition point value determined for each of the one or more monitored computing devices.

17. A method, comprising:
determining, by a computing device, first and second metric ranges for a count of forward error corrections, and assigning a corresponding forward error corrections condition point value to each of one or more monitored computing devices when determining a health of each of the one or more monitored computing devices;
determining first and second metric ranges for a count of uncorrectable forward error correction errors, and assigning a corresponding uncorrectable forward error correction errors condition point value to each of the one or more monitored computing devices when determining the health of each of the one or more monitored computing devices;
determining first and second metric ranges for an automatic gain control level, and assigning a corresponding automatic gain control condition point value to each of the one or more monitored computing devices when determining the health of each of the one or more monitored computing devices;
determining first and second metric ranges for a count of lost locks, and assigning a corresponding lost lock condition point value to each of the one or more monitored computing devices when determining the health of each of the one or more monitored computing devices;
determining first and second metric ranges for a count of program clock reference errors, and assigning a corresponding program clock reference error condition point value to each of the one or more monitored computing devices when determining the health of each of the one or more monitored computing devices;
determining first and second metric ranges for a count of presentation time stamp errors, and assigning a corresponding presentation time stamp error condition point value to each of the one or more monitored computing devices when determining the health of each of the one or more monitored computing devices; and
combining each condition point value assigned to each of the one or more monitored computing devices to yield a combined condition point value for each of the one or more monitored computing devices.

18. The method of claim 17, further comprising:
comparing a first combined condition point value to a threshold; and
based on a result of the comparing, generating an output alarm indicating health of a first monitored computing device associated with the first combined condition point value.

19. The method of claim 17, wherein each of the one or more monitored computing devices is part of a network, the method further comprising determining a health of the network based on the combined condition point value determined for each of the one or more monitored computing devices.

20. An apparatus comprising:
one or more processors; and
memory storing instructions that, when executed by the one or more processors, cause the apparatus to:
determine a plurality of performance metrics for one or more monitored computing devices;
determine, for each of the plurality of performance metrics, a first metric range and a second metric range;
determine, for each of the plurality of performance metrics, a first condition point value corresponding to the first metric range determined for that performance metric and a second condition point value corresponding to the second metric range determined for that performance metric;
for each performance metric of the plurality of performance metrics:
determine a measured value for that performance metric for a first monitored computing device of the one or more monitored computing devices;
when the measured value is within a first metric range determined for that performance metric, assign a first condition point value determined for that first metric range to the first monitored computing device; and
when the measured value is within a second metric range determined for that performance metric, assign a second condition point value determined for that second metric range to the first monitored computing device; and
combine each condition point value assigned to the first monitored computing device to yield a first combined condition point value for the first monitored computing device.

21. The apparatus of claim 20, wherein the instructions, when executed by the one or more processors, further cause the apparatus to:
for each performance metric of the plurality of performance metrics:
determine a measured value for that performance metric for a second monitored computing device of the one or more monitored computing devices;
when the measured value is within the first metric range determined for that performance metric, assign the first condition point value determined for that first metric range to the second monitored computing device; and
when the measured value is within the second metric range determined for that performance metric, assign the second condition point value determined for that second metric range to the second monitored computing device; and combine each condition point value assigned to the second monitored computing device to yield a second combined condition point value for the second monitored computing device.

* * * * *

UNITED STATES PATENT AND TRADEMARK OFFICE
CERTIFICATE OF CORRECTION

| | | |
|---|---|---|
| PATENT NO. | : 9,960,984 B2 | Page 1 of 1 |
| APPLICATION NO. | : 14/961089 | |
| DATED | : May 1, 2018 | |
| INVENTOR(S) | : Leach et al. | |

It is certified that error appears in the above-identified patent and that said Letters Patent is hereby corrected as shown below:

In the Specification

Column 14, Detailed Description, Line 2:
Please delete "types.]" and insert --types.--

Column 15, Detailed Description, Line 10:
After "103", insert --)--

In the Claims

Column 17, Claim 4, Line 27:
Please delete "value, and" and insert --value; and--

Signed and Sealed this
Fifth Day of February, 2019

Andrei Iancu
*Director of the United States Patent and Trademark Office*